United States Patent
Forlenza et al.

(10) Patent No.: US 8,364,980 B2
(45) Date of Patent: *Jan. 29, 2013

(54) SYSTEM FOR SELECTIVE ENCRYPTION WITHIN DOCUMENTS

(75) Inventors: Randolph Michael Forlenza, Austin, TX (US); Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,844

(22) Filed: Jan. 13, 2012

(65) Prior Publication Data
US 2012/0117388 A1    May 10, 2012

Related U.S. Application Data

(60) Continuation of application No. 12/001,475, filed on Dec. 11, 2007, now Pat. No. 8,140,857, which is a division of application No. 10/692,142, filed on Oct. 23, 2003, now Pat. No. 7,346,769.

(51) Int. Cl.
    G06F 21/00    (2006.01)
(52) U.S. Cl. .................................. 713/189; 713/182
(58) Field of Classification Search .................. None
    See application file for complete search history.

(56) References Cited

U.S. PATENT DOCUMENTS

| | | | |
|---|---|---|---|
| 4,782,529 A | 11/1988 | Shima | |
| 5,157,763 A | 10/1992 | Peters et al. | |
| 5,212,784 A | 5/1993 | Sparks | |
| 5,267,313 A | 11/1993 | Hirata | |
| 5,541,997 A | 7/1996 | Pappas et al. | |
| 5,673,316 A | 9/1997 | Auerbach et al. | |
| 5,933,498 A | 8/1999 | Schneck et al. | |
| 6,023,506 A | 2/2000 | Ote et al. | |
| 6,339,825 B2 | 1/2002 | Pensak et al. | |
| 6,598,161 B1 | 7/2003 | Kluttz et al. | |
| 6,631,482 B1 | 10/2003 | Marks | |
| 6,651,171 B1 | 11/2003 | England et al. | |
| 6,868,495 B1 | 3/2005 | Glover | |
| 6,920,567 B1 | 7/2005 | Doherty et al. | |
| 6,941,459 B1 | 9/2005 | Hind et al. | |
| 6,954,532 B1 | 10/2005 | Handley et al. | |
| 7,003,664 B2 | 2/2006 | Kori | |
| 7,103,915 B2 | 9/2006 | Redlich et al. | |
| 7,178,033 B1 | 2/2007 | Garcia | |
| 7,322,047 B2 | 1/2008 | Redlich et al. | |

(Continued)

FOREIGN PATENT DOCUMENTS
WO    0201271    1/2002

OTHER PUBLICATIONS

Office Action (Mail Date Apr. 29, 2008) for U.S. Appl. No. 10/824,806, filed Apr. 15, 2004, Confirmation No. 6685.

(Continued)

*Primary Examiner* — Benjamin Lanier
(74) *Attorney, Agent, or Firm* — Schmeiser, Olsen & Watts; Mark Vallone

(57) ABSTRACT

A system for selective encryption within a document. A portion of the document selected and marked for encryption is detected, the selected portion of the document including plaintext. The detected portion of the document selected for encryption is encrypted as ciphertext. The document is displayed with the selected portion of the document encrypted. An attempt by an accessor to access the encrypted portion of document is detected. The encrypted portion of the document is decrypted with a proper decryption key, wherein the decrypting includes decrypting the encrypted portion of the document in response to presentation of required data by the accessor. The required data includes the proper decryption key, a name of the accessor, and an employee number of the accessor. The portion of the document is displayed as decrypted.

11 Claims, 10 Drawing Sheets

U.S. PATENT DOCUMENTS

| | | | |
|---|---|---|---|
| 7,346,769 | B2 | 3/2008 | Forlenza et al. |
| 7,484,107 | B2 | 1/2009 | Forlenza et al. |
| 7,600,183 | B2 | 10/2009 | Stern et al. |
| 7,870,386 | B2 | 1/2011 | Forlenza et al. |
| 7,917,771 | B2 | 3/2011 | Forlenza et al. |
| 2002/0051545 | A1 | 5/2002 | Ogilvie |
| 2002/0083325 | A1 | 6/2002 | Mediratta et al. |
| 2002/0159594 | A1 | 10/2002 | Kori |
| 2003/0021412 | A1 | 1/2003 | Candelore et al. |
| 2003/0110131 | A1 | 6/2003 | Alain et al. |
| 2003/0179412 | A1 | 9/2003 | Matsunoshita |
| 2004/0025019 | A1 | 2/2004 | Watanabe et al. |
| 2004/0123126 | A1 | 6/2004 | Lee |
| 2005/0071657 | A1 | 3/2005 | Ryan |
| 2005/0091499 | A1 | 4/2005 | Forlenza et al. |
| 2005/0235163 | A1 | 10/2005 | Forlenza et al. |
| 2005/0246526 | A1 | 11/2005 | Forlenza et al. |
| 2008/0168277 | A1 | 7/2008 | Forlenza et al. |
| 2008/0270807 | A1 | 10/2008 | Forlenza et al. |

OTHER PUBLICATIONS

Amendment filed Jun. 10, 2008 in response to Office Action (Mail Date Apr. 29, 2008) for U.S. Appl. No. 10/824,806, filed Apr. 15, 2004, Confirmation No. 6685.
Notice of Allowance (Mail Date Sep. 17, 2008) for U.S. Appl. No. 10/824,806, filed Apr. 15, 2004, Confirmation No. 6685.
Office Action (Mail Date Sep. 11, 2009) for U.S. Appl. No. 12/135,321, filed Jun. 9, 2008, Confirmation No. 3528.
Amendment filed Dec. 11, 2009 in response to Office Action (Mail Date Sep. 11, 2009) for U.S. Appl. No. 12/135,321, filed Jun. 9, 2008, Confirmation No. 3528.
Final Office Action (Mail Date Mar. 5, 2010) for U.S. Appl. No. 12/135,321, filed Jun. 9, 2008, Confirmation No. 3528.
Amendment After Final filed May 3, 2010 in response to Final Office Action (Mail Date Mar. 5, 2010) for U.S. Appl. No. 12/135,321, filed Jun. 9, 2008, Confirmation No. 3528.
Advisory Action (Mail Date May 17, 2010) for U.S. Appl. No. 12/135,321, filed Jun. 9, 2008, Confirmation No. 3528.
Request for Continued Examination filed Jun. 2, 2010 for U.S. Appl. No. 12/135,321, filed Jun. 9, 2008, Confirmation No. 3528.
Office Action (Mail Date Jun. 9, 2010) for U.S. Appl. No. 12/135,321, filed Jun. 9, 2008, Confirmation No. 3528.
Amendment filed Sep. 7, 2010 in response to Office Action (Mail Date Jun. 9, 2010) for U.S. Appl. No. 12/135,321, filed Jun. 9, 2008, Confirmation No. 3528.
Notice of Allowance (Mail Date Nov. 22, 2010) for U.S. Appl. No. 12/135,321, filed Jun. 9, 2008, Confirmation No. 3528.
Office Action (Mail Date Jan. 30, 2008) for U.S. Appl. No. 10/692,142, filed Oct. 23, 2003, Confirmation No. 9190.
Amendment filed Jul. 10, 2007 in response to Office Action (Mail Date Jan. 30, 2007) for U.S. Appl. No. 10/692,142, filed Oct. 23, 2003, Confirmation No. 9190.
Supplemental Amendment filed Aug. 21, 2007 in response to Office Action (Mail Date Jan. 30, 2007) for U.S. Appl. No. 10/692,142, filed Oct. 23, 2003, Confirmation No. 9190.
Notice of Allowance (Mail Date Oct. 31, 2007) for U.S. Appl. No. 10/692,142, filed Oct. 23, 2003, Confirmation No. 9190.

Office Action (Mail Date Oct. 7, 2009) for U.S. Appl. No. 12/001,475, filed Dec. 11, 2007, Confirmation No. 3221.
Amendment filed Jan. 4, 2010 in response to Office Action (Mail Date Oct. 7, 2009) for U.S. Appl. No. 12/001,475, filed Dec. 11, 2007, Confirmation No. 3221.
Office Action (Mail Date Feb. 19, 2010) for U.S. Appl. No. 12/001,475, filed Dec. 11, 2007, Confirmation No. 3221.
Amendment filed May 18, 2010 in response to Office Action (Mail Date Feb. 19, 2010) for U.S. Appl. No. 12/001,475, filed Dec. 11, 2007, Confirmation No. 3221.
Final Office Action (Mail Date Jun. 2, 2010) for U.S. Appl. No. 12/001,475, filed Dec. 11, 2007, Confirmation No. 3221.
Request for Continued Examination and Preliminary Amendment filed Sep. 2, 2010 in response to Final Office Action (Mail Date Jun. 2, 2010) for U.S. Appl. No. 12/001,475, filed Dec. 11, 2007, Confirmation No. 3221.
Notice of Allowance (Mail Date Nov. 21, 2011) for U.S. Appl. No. 12/001,475, filed Dec. 11, 2007, Confirmation No. 3221.
Office Action (Mail Date Mar. 17, 2008) for U.S. Appl. No. 10/835,502, filed Apr. 29, 2004, Confirmation No. 7993.
Amendment filed Aug. 29, 2008 in response to Office Action (Mail Date Mar. 17, 2008) for U.S. Appl. No. 10/835,502, filed Apr. 29, 2004, Confirmation No. 7993.
Final Office Action (Mail Date Aug. 29, 2008) for U.S. Appl. No. 10/835,502, filed Apr. 29, 2004, Confirmation No. 7993.
Amendment After Final filed Dec. 1, 2008 in response to Final Office Action (Mail Date Aug. 29, 2008) for U.S. Appl. No. 10/835,502, filed Apr. 29, 2004, Confirmation No. 7993.
Advisory Action (Mail Date Dec. 10, 2008) for U.S. Appl. No. 10/835,502, filed Apr. 29, 2004, Confirmation No. 7993.
Notice of Appeal filed Dec. 29, 2008 for U.S. Appl. No. 10/835,502, filed Apr. 29, 2004, Confirmation No. 7993.
Appeal Brief filed Feb. 18, 2009 for U.S. Appl. No. 10/835,502, filed Apr. 29, 2004, Confirmation No. 7993.
Notice of Non-Compliant Appeal Brief (Mail Date Mar. 12, 2009) for U.S. Appl. No. 10/835,502, filed Apr. 29, 2004, Confirmation No. 7993.
Appeal Brief filed Jul. 13, 2009 in response to Notice of Non-Compliant Appeal Brief (Mail Date Mar. 12, 2009) for U.S. Appl. No. 10/835,502, filed Apr. 29, 2004, Confirmation No. 7993.
Office Action (Mail Date Sep. 21, 2009) for U.S. Appl. No. 10/835,502, filed Apr. 29, 2004, Confirmation No. 7993.
Amendment filed Dec. 21, 2009 in response to Office Action (Mail Date Sep. 21, 2009) for U.S. Appl. No. 10/835,502, filed Apr. 29, 2004, Confirmation No. 7993.
Final Office Action (Mail Date Mar. 12, 2010) for U.S. Appl. No. 10/835,502, filed Apr. 29, 2004, Confirmation No. 7993.
Amendment After Final filed Apr. 20, 2010 in response to Final Office Action (Mail Date Mar. 12, 2010) for U.S. Appl. No. 10/835,502, filed Apr. 29, 2004, Confirmation No. 7993.
Advisory Action (Mail Date Apr. 20, 2010) for U.S. Appl. No. 10/835,502, filed Apr. 29, 2004, Confirmation No. 7993.
Request for Continued Examination and Preliminary Amendment filed Jul. 12, 2010 for U.S. Appl. No. 10/835,502, filed Apr. 29, 2004, Confirmation No. 7993.
Notice of Allowance (Mail Date Sep. 2, 2010) for U.S. Appl. No. 10/835,502, filed Apr. 29, 2004, Confirmation No. 7993.

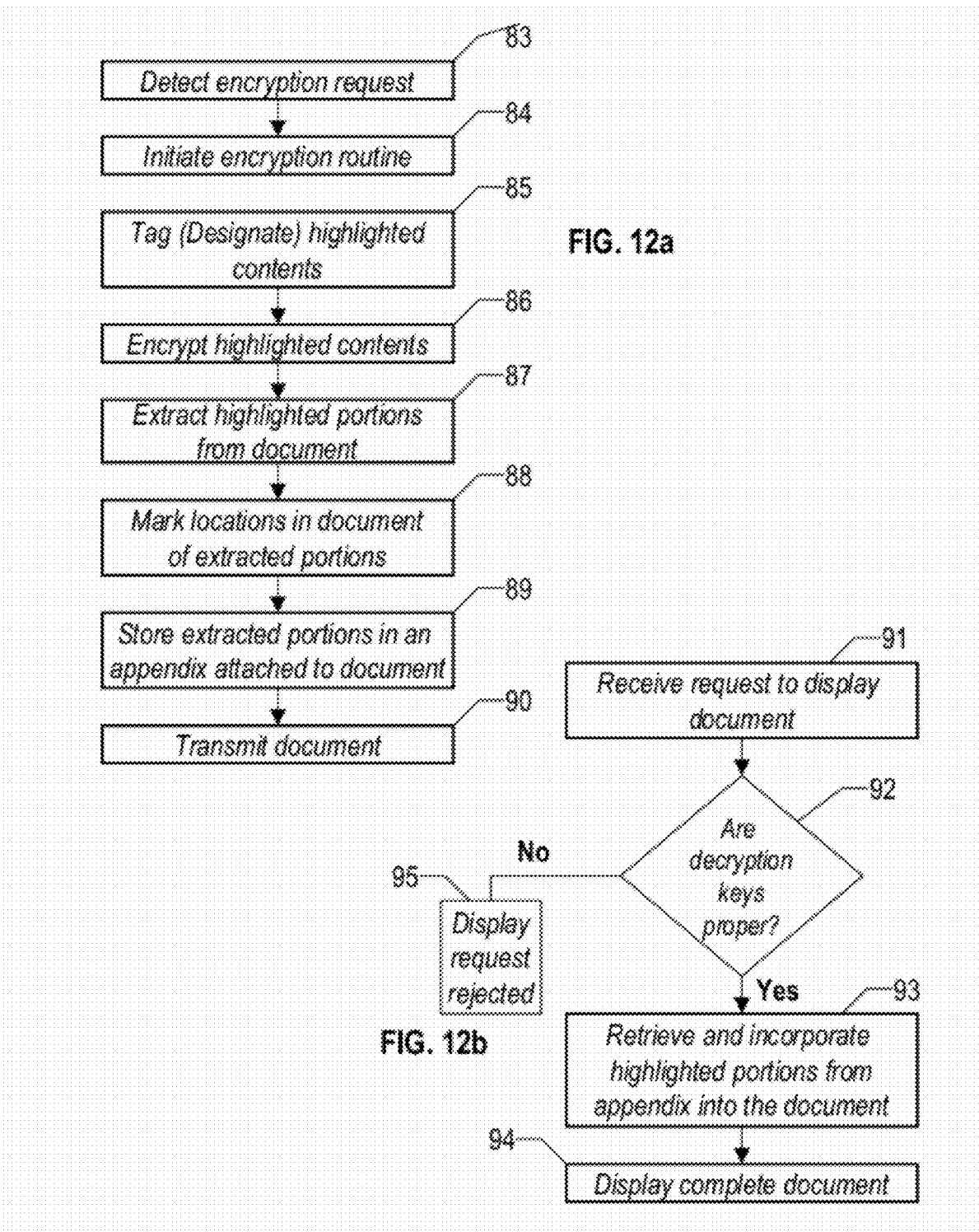

SYSTEM FOR SELECTIVE ENCRYPTION WITHIN DOCUMENTS

This application is a continuation application claiming priority to Ser. No. 12/001,475, filed Dec. 11, 2007, now U.S. Pat. No. 8,140,857, issued Mar. 20, 2012; which is a divisional of Ser. No. 10/692,142, filed Oct. 23, 2003 which is now U.S. Pat. No. 7,346,769, issued Mar. 18, 2008.

FIELD OF THE INVENTION

The present invention provides a method and system for protecting and securing electronic documents and in particular to a method and system for selectively concealing portions of a document while leaving the remaining portions of the document unchanged.

BACKGROUND OF THE INVENTION

The present day computer systems can enable a user to create various types of documents. These documents can contain text, graphics, images or a combination of each. Many times the creator of a document for various reasons desires to keep secret the contents of a document. Often times the secrecy is for security reasons. In many businesses, various types of documents that exist on computer systems contain confidential information that can be related to the company's trade secrets and business strategies. Most technology related companies maintain much of their research and product development information on computer systems that are protected by elaborate security systems. Governmental agencies also maintain much of their documented information on a confidential basis. Even individuals keep important records and other information in confidential files.

Often, it is necessary to share documentation that contains confidential information with persons. Presently, there are various ways to secure the documents and prevent unauthorized persons from viewing the contents of a document. One way to protect documents is zip the document in a secured file that can be password protected. In this approach, when someone desires to access the document, that person must first submit the proper password. If the password is correct, the document is retrieved and displayed for the requesting viewer. During transmission of a document over a computing network such as the Internet, the document can be attached to an electronic message and transmitted with the message. The receiver of the message can download the attachment and with the proper password, retrieve the attached and secured document.

In other situations, a person must show that they have authority to access a computing network from which one can access certain confidential information. These systems typically exist in financial settings such as accessing bank or credit accounts.

A third technique used today to secure the contents of a document is to encrypt the document contents. In this approach, the document would be encrypted and stored by the document creator. To access the document, one would need to have the proper decryption key(s). In many cases, the documents would be transmitted over a computing network to a destination location. The encryption would serve to secure the document during the transmission of the document over the network. Again, at the destination location, decryption would occur using the appropriate decryption keys.

One disadvantage is that the current document security systems are all or nothing propositions. With reference to document encryption, today, the only known means of encrypting certain elements of a document is to encrypt the entire document. Encryption currently may be accomplished only during a transmission (HTTPS) or permanently (via RSC, for example). Regardless, the entire document is encrypted. The drawback to this approach is that encryption imposes a serious performance impact and usability impact. HTTPS transmissions, for example, are in the neighborhood of 20%-30% slower than decrypted HTTP transmissions. Similarly, encrypting an entire document locally is costly, especially when only certain parts of the document (for example, user name, telephone, address, and credit card numbers in an order) actually need the security that encryption provides. Furthermore, the process of encrypting the document is usually inconvenient, at best, requiring the user isolate it as a separate file and then invoking a suitable tool for encrypting it.

As mentioned, currently, document security is an all or nothing task. There remains a need for a document security system in which a user could select only specified portions of a document for concealment, while displaying other portions unconcealed portions of the document.

SUMMARY OF THE INVENTION

It is an objective of the present invention to provide a method for selectively concealing portions of a document.

It is a second objective of the present invention to provide a method for concealment of selective portions of a document through encryption techniques.

It is a third objective of the present invention is to provide a method for securing the confidential contents of a document through selective concealment of the confidential contents.

It is a fourth objective of the present invention is to provide for selective decryption of encrypted sections of a document.

The present invention allows the user (author or creator) of a document to select certain portions of a document for concealment while other portions of the document remain displayed as created. The user would use a standard word processing editor technique to highlight (or swipe) portions of a document that the user desires to be concealed. The highlighted area would then be 'tagged' with a surrounding attribute indicating to the word processor that highlighted area is to be concealed. This process is similar to the existing word processor capability to highlight areas on a document and then assign rich text attributes, such as BOLD, ITALICS, etc., to those areas. The concealed areas could then be dispositioned in at least two formats:

One format could be document encryption. In this method, the selected areas could be encrypted in place. I.e., the target areas are encrypted and stored within the document itself. When the document is displayed if the appropriate decryption keys are offered, the encrypted areas are converted back to text and displayed as they were originally written. If the decryption keys are not offered or are incorrect, the target areas are displayed as gibberish to maintain placement of objects in the surrounding parts of the document or a message or graphic is substituted indicating decryption failed. In addition, when a section is not decrypted, an alternative method of displaying that section is to show a box for entering a decryption key and a button to press to activate the decryption process.

In a second approach, the target areas are detected from the host document and stored as an appendage (extended attribute) to the host document. This could be accomplished in the same manner that OS/2, DOS, and Windows systems do via formatted extended attribute file extensions. It could also be accomplished by wrapping the extracted encrypted area in GML-like tags, such as XML wrappers, which indicate to the word processor that the attachments require decryption to be viewable. In this case, the host document would contain placeholders where the extracted encrypted area was removed. In turn, the encrypted areas stored externally would contain (GML or XML, etc.) escape sequences or tags that indicate to the word processor where the extracted areas reside within the host document. Both of the methods described above and other possible embodiments require that the encryption methodology used be identified such that the word processor can determine that is necessary to first encrypt and then to later decrypt the targeted areas. Both of the methods described above and other possible embodiments require that the encryption methodology used be identified such that the word processor can determine that is necessary to first encrypt and then to later decrypt the targeted areas.

A third approach could be an alternative version of the second approach. In this approach, the target areas are extracted from the host document and stored as an appendage (extended attribute) to the host document as with the second method. The document would also contain placeholders to indicate where the extracted area was removed from the document. In turn, the extracted areas stored externally would contain escape sequences or tags that indicate to the word processor where the extracted areas reside within the host document. The appendage would be protected and could only be accessed by demonstrating proper authorization. An authorization process could be used to supply a proper password.

This methodology of the present invention could be extended for transmission purposes as well. For example, rather than encrypting an entire document (via HTTPS, for example) during transmission, the transmission function could be enhanced to transmit the body of the host document (or file) and then search for an extended attribute (appendage) entity which indicated that encryption is required. If such an appendage were located, it would be encrypted for transmission. At the receiving end of the transmission, the process would detect any appendage to the message. The encrypted sections in the appendage would then be decrypted as soon as the reader provides the proper key or keys. This process can be accomplished completely transparent to both the sender and the recipient.

DESCRIPTION OF THE DRAWINGS

FIG. 12a is a flow diagram of the present invention in which encryption, extraction and attachment techniques are used to conceal selected portions of a document for transmission across a computing network.

FIG. 12b is a flow diagram of the method of the present invention in which retrieval, decryption and insertion techniques are used to restore concealed portions of a document following transmission of the document across a computing network.

DETAILED DESCRIPTION OF THE INVENTION

Figure 1:
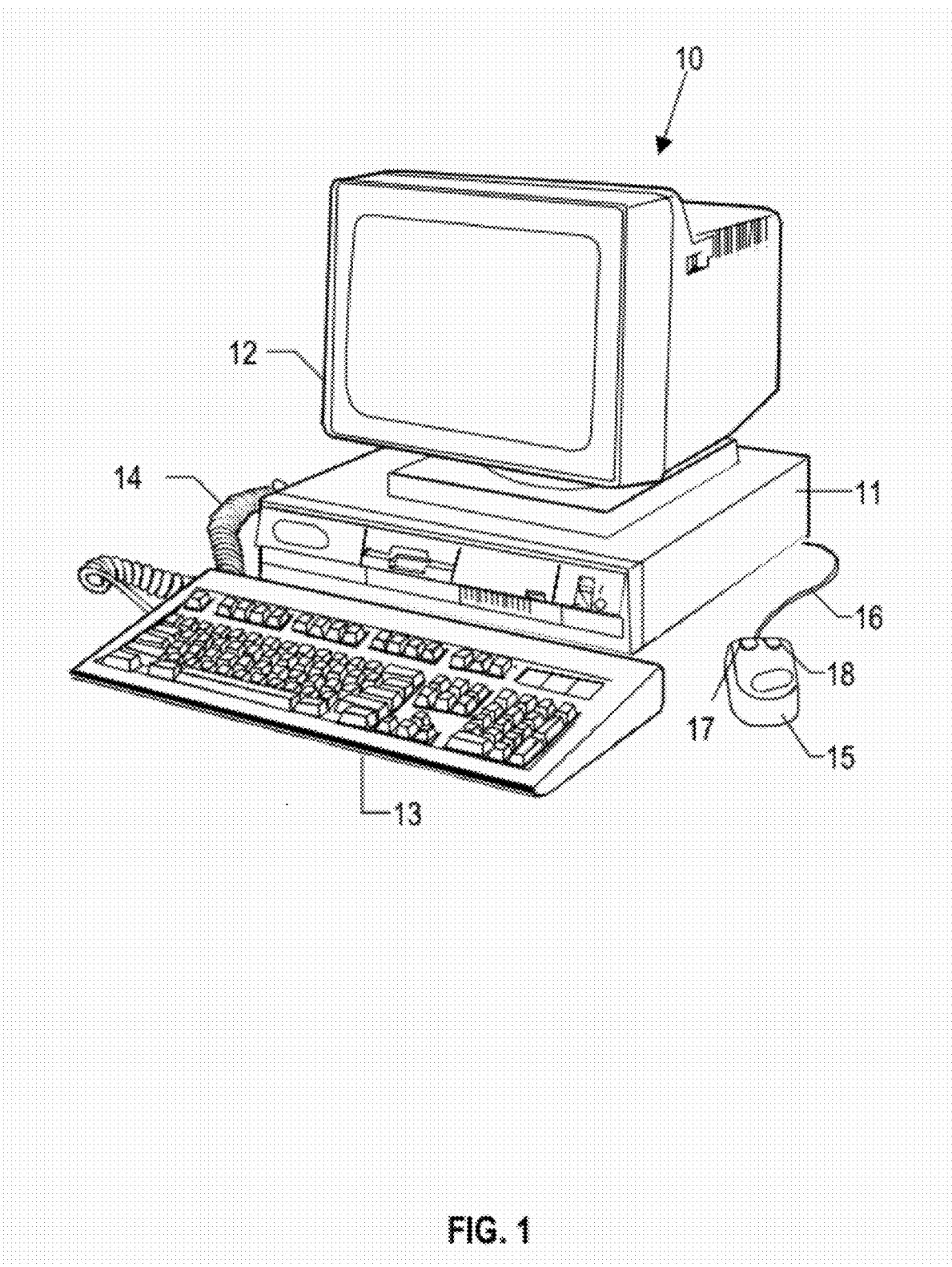
FIG. 1 depicts a pictorial representation of data processing system that can be used in the implementation of the present invention.

The present invention uses encryption techniques to conceal selective portions of a document. These encryption schemes transform data into a format that is readable when decrypted using predetermined decryption keys. User authentication and Data Encryption schemes provide the ability to authenticate, encrypt and decrypt certain information. This present invention can implement a public key/private key encryption scheme to protect data as it is displayed or as it traverses across public networks.

Symmetric, or private key, encryption (also known as conventional encryption) is based on a secret key that is shared by both communicating parties. The sending party uses the secret key as part of the mathematical operation to encrypt (or encipher) plaintext to ciphertext. The receiving party uses the same secret key to decrypt (or decipher) the ciphertext to plaintext. Examples of symmetric encryption schemes are the RSA RC4 algorithm (which provides the basis for Microsoft Point-to-Point Encryption (MPPE), Data Encryption Standard (DES), the International Data Encryption Algorithm (IDEA), and the Skipjack encryption technology proposed by the United States government (and implemented in the Clipper chip).

Asymmetric or public key encryption uses two different keys for each user: one key is a private key known only to the user to which the key pair belongs; the other is a corresponding public key, which is accessible to anyone. The encryption algorithm mathematically relates the private and public keys. One key is used for encryption and the other for decryption, depending on the nature of the communication service being implemented. In addition, public key encryption technologies allow digital signatures to be placed on messages. A digital signature uses the sender's private key to encrypt some portion of the message. When the message is received, the receiver uses the sender's public key to decipher the digital signature as a way to verify the sender's identity and the integrity of the message.

With symmetric encryption, both the sender and receiver have a shared secret key. The distribution of the secret key must occur (with adequate protection) prior to any encrypted communication. However, with asymmetric encryption, the sender uses the recipient's public key to encrypt or digitally sign messages, while the receiver uses their key to decipher these messages. The public key can be freely distributed to anyone who needs to encrypt messages to the owner of the public key or to verify digitally signed messages by the private key that corresponds to the public key. The owner of the key pair only needs to carefully protect the private key.

To secure the integrity of the public key, the public key is published with a certificate. A certificate (or public key certificate) is a data structure that is digitally signed by a certificate authority (CA). The CA is an authority that users of the certificate can trust. The certificate contains a series of values, such as the certificate name and usage, information identifying the owner of the public key, the public key itself, an expiration date, and the name of the certificate authority. The CA uses its private key to sign the certificate. If the receiver knows the public key of the certificate authority, the receiver can verify that the certificate is indeed from the trusted CA, and therefore contains reliable information and a valid public key. Certificates can be distributed electronically (via Web access or e-mail), on smart cards, or in an LDAP database. Public key certificates provide a convenient, reliable method for verifying the identity of a sender. IPSec can optionally use this method for end-to-end authentication.

A public and private key pair is a unique association of key values wherein one key can encrypt information and the other can decrypt. For example, the public key can encrypt data and only the corresponding private key can decrypt the data. Public and private keys are used for signing and sending encrypted messages. A public key is typically made available to users on a global computer network (the Internet) within a certificate stored in a publicly accessible Lightweight Directory Application Protocol (LDAP) directory. The associated private key is kept in confidence by the entity, such as the person or cooperation that owns the key pair.

With reference now to FIG. 1, there is depicted a pictorial representation of computing device 10 which may be used in implementation of the present invention. As may be seen, data processing system 10 includes processor 11 that preferably includes a graphics processor, memory device, storage device, and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a_graphical pointing device, such as mouse 15 (other examples of pointing devices include a light pen and a roller ball). Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Figure 2:
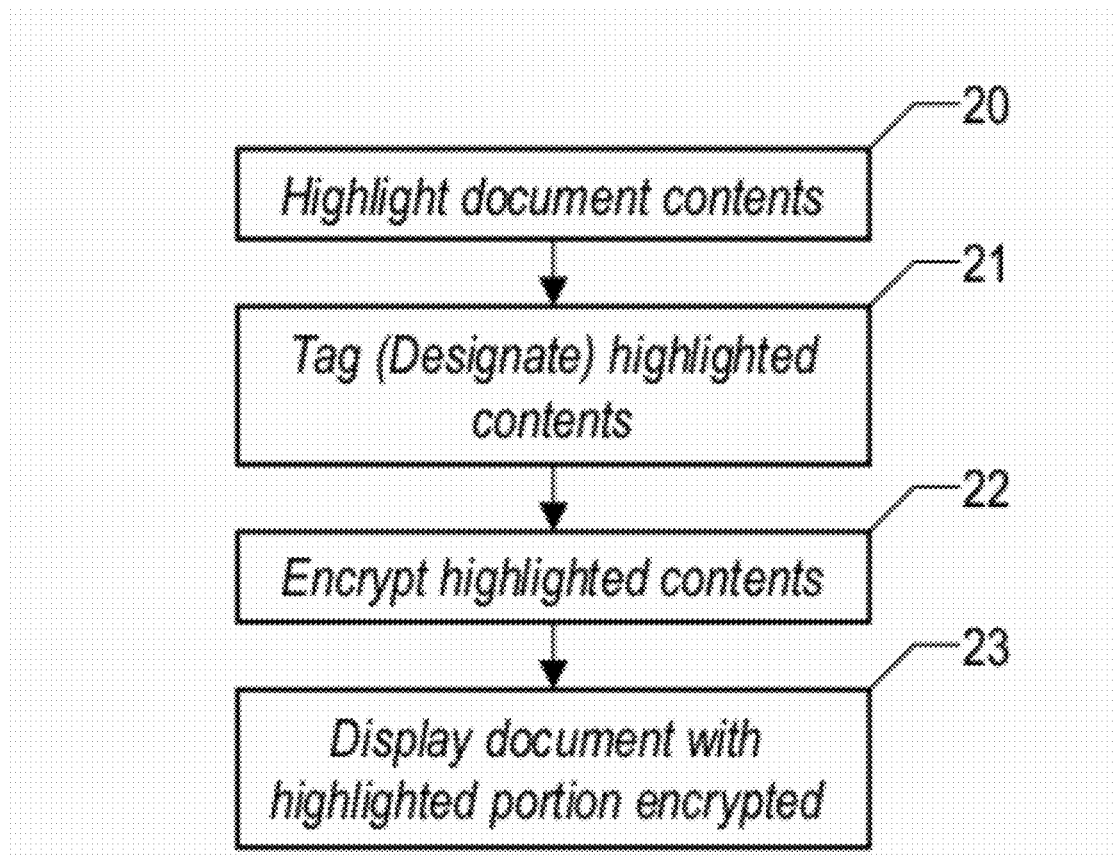
FIG. 2 is a flow diagram of the general method for implementing the concepts of the present invention.

Referring to FIG. 2, shown is a flow diagram of the general method for implementing the concepts of the present invention. During the creation of a document, the creator/user may desire to encrypt certain portions of the document for security reasons. In accordance with this invention, in step 20, the user can highlight a desired portion of the document. This process is the same as highlighting for other purposes such as to BOLD, UNDERLINE or ITALICIZE a portion of the document. In a typical highlighting process, the highlighting is accomplished by holding the mouse button down and moving the cursor, (also called "dragging" or "swiping"), over the text that the user desires to highlight. As the cursor moves over text, all text covered by the cursor is indicated on the screen. When the user releases the button, no further text is highlighted with that particular cursor movement. The next step, 21, would be to initialize the encryption process of the present invention. As with other functions, the user could click ENCRYPT icon, shown in FIG. 3, to initiate encryption process. In this encryption process, after the user has highlighted the desired text, the user will then select the encryption key for the encrypted information. As mentioned the user can click the ENCRYPT icon. At this point, a pop-up can appear to enable the user to choose the encryption key from a preset list or to create in a new key that will be for the encrypted information. Another key selection method could be for the word processor or other tool being used to prompt the user for the key that will be used to encrypt the highlighted portion of the document. One additional option could be to specify several keys to be used (presumably to target different sets of ultimate readers) so that when a portion of the document is highlighted, a reader need only choose one of the provided keys instead of typing the actual key each time. When there is a preset list of keys, one would not show the actual key. This approach provides some security against person looking over the shoulder of the reader and observing the key. In this method, the reader would enter a name for the key initially and this name would be displayed for each pre-entered key. Still another approach would be to always show the last 10 or so keys entered (by name) similar to one opens a new document, where the user has the option of choosing one of several recently edited documents.

After receiving the encryption key, during this encryption process, step 22, the highlighted portion of the document would be encrypted using the encryption routines available for that word processor. Following the encryption process, in step 23, the document is displayed containing encrypted portions. In an alternative approach, the encrypted section may not be shown as gibberish to the author but rather optionally modified in some other way to indicate that the section is encrypted. For example the encrypted section might have fine diagonal red lines drawn under the text. Also, when a reader decrypts a section, it might not turn into simple black on white text, but again may be displayed in a unique manner to show that it was a section that was encrypted and warn the reader that this section should be treated carefully. A situation where this precaution may be needed is when someone is hovering over the reader's shoulder trying to also read the screen.

Figure 3:
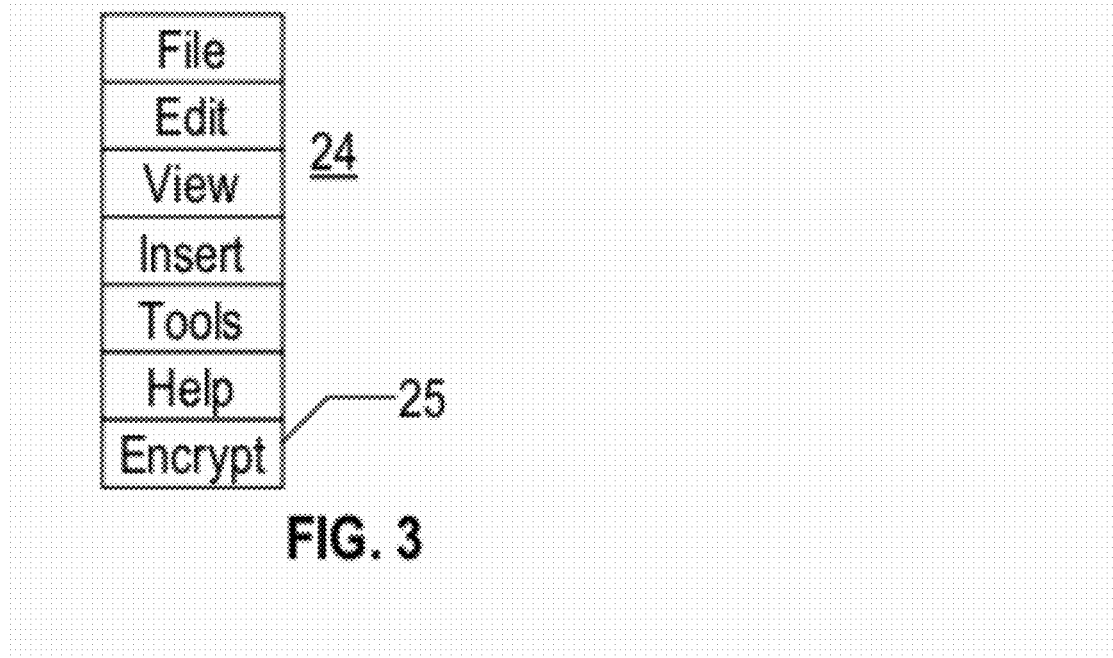
FIG. 3 is a pop-up menu of a word processor program containing the ENCRYPT icon of the present invention.

Referring to FIG. 3, shown is an illustration of a pop-up menu 24 containing icons for various word processing functions. In this menu is an ENCRYPT icon 25. Instead of including the ENCRYPTION icon 25 in a pop-up menu, another option is to include the encryption icon as one of the general function icons continually displayed during an editing session similar to the BOLD and UNDERLINE icons.

Figure 4A:
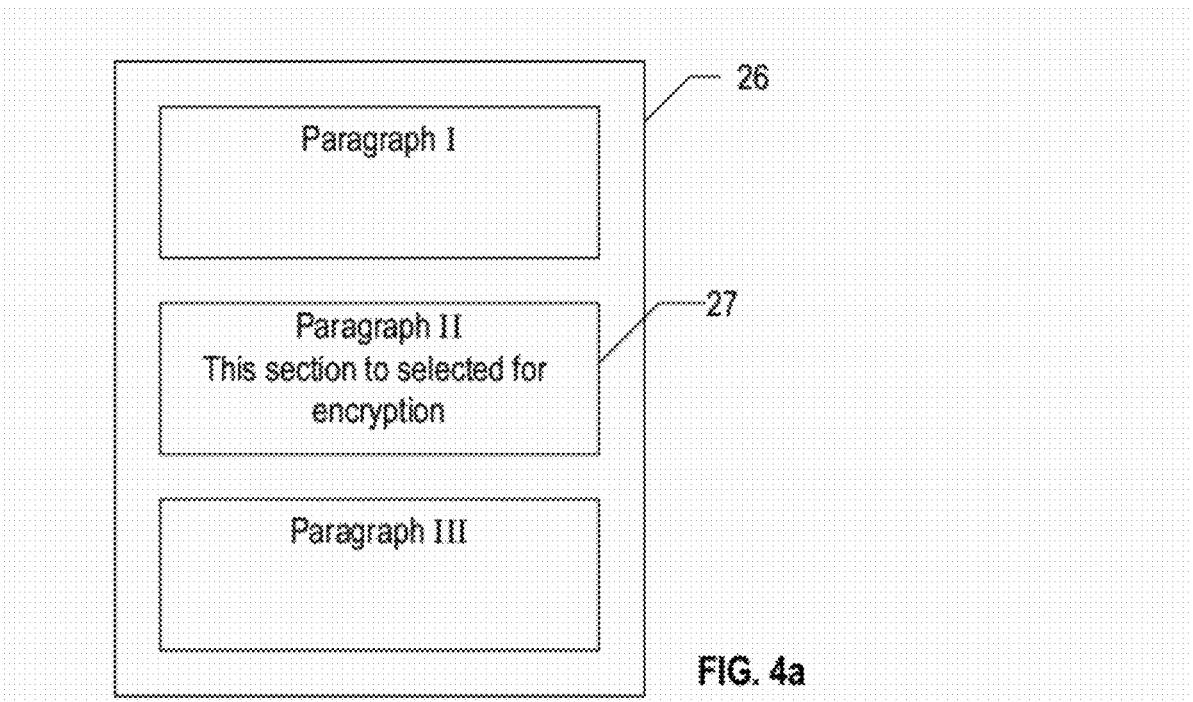
FIG. 4a is an illustration of a document containing sections that could be encrypted in accordance with the method of the present invention.
Figure 4B:
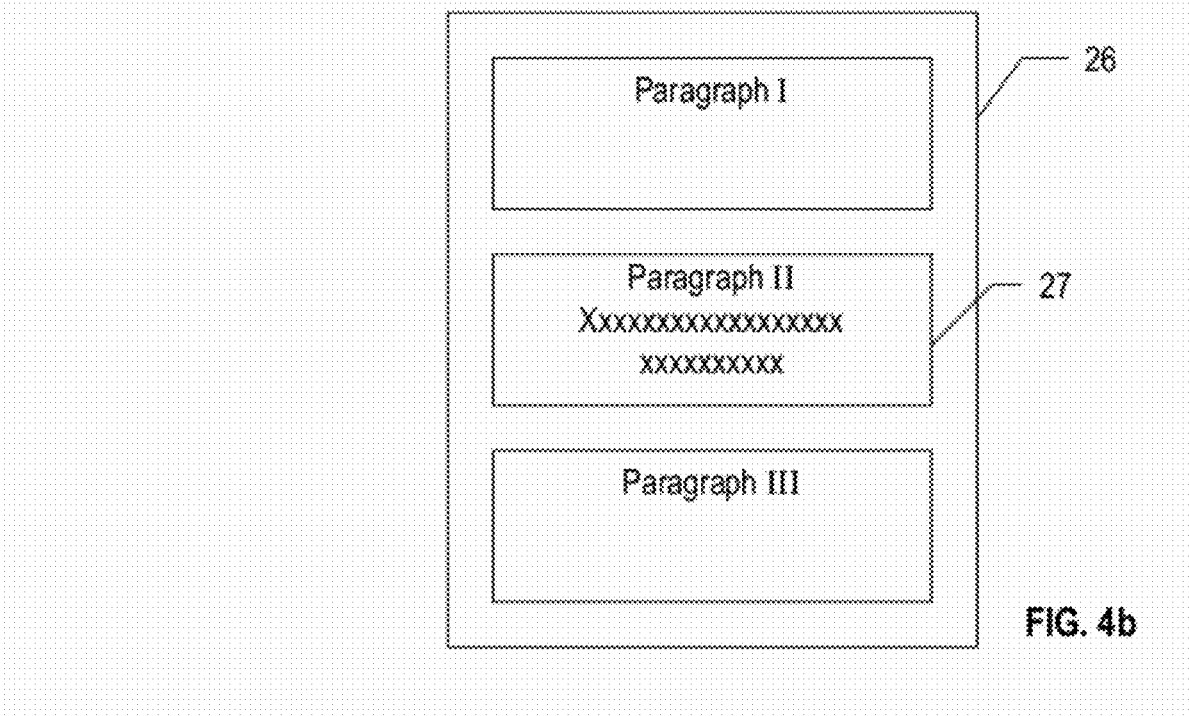
FIG. 4b is an illustration of the document containing an encrypted section in accordance with the method of the present invention.

Referring to FIG. 4a, shown is a typical document 26 created during a word processing session. This particular document contains paragraphs 27. During an editing session, if a user may want to encrypt the contents of paragraph 27, the user can highlight that paragraph and click the ENCRYPT icon 25. The encryption process will then encrypt the highlighted contents. FIG. 4b shows the resulting document with the designated paragraph 27 shown in an encrypted format.

Figure 5A:
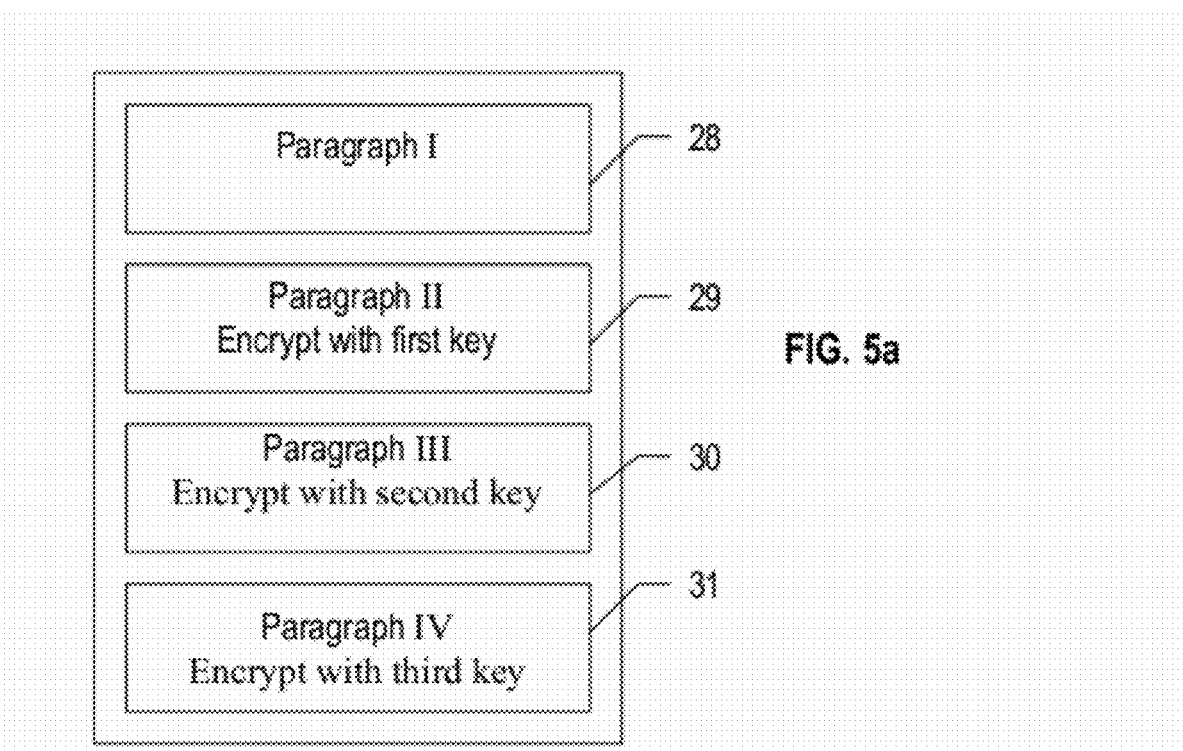
FIG. 5a is an illustration of a document containing multiple sections that can be selected for separate and unique encryption.

FIG. 5a is an illustration of a document containing multiple sections that can be selected for separate and unique encryption. As shown, this document contains four paragraphs. In this example, a user can choose to designate three of the paragraphs for encryption. The user can choose to leave paragraph 28 in the initially created form for anyone to read. However, a user may only want certain people to see certain information. With the features of the present invention, a user can create one document with some general information for everyone and some specific information for different people. Paragraphs 29, 30 and 31 could be designated for different groups of viewers. As a result, each paragraph could be encrypted with the same or with unique encryption keys.

Figure 5B:
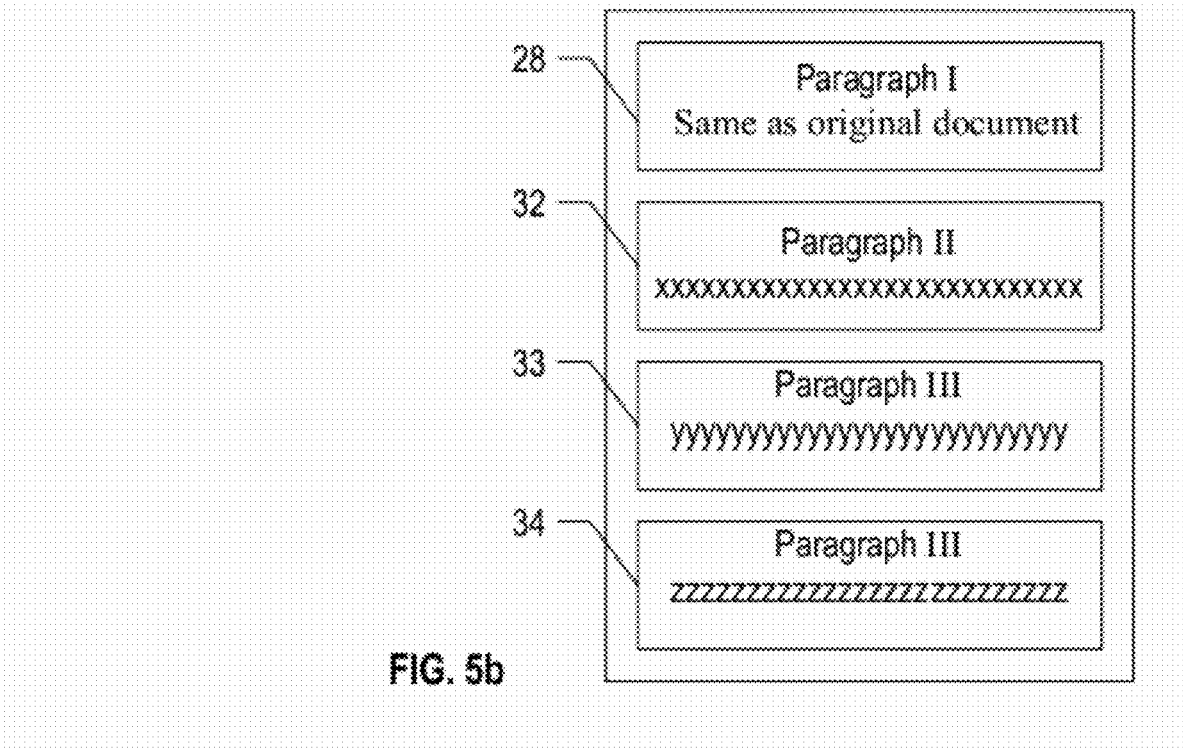
FIG. 5b is an illustration of the document with selected areas with each area having a unique and separate encryption from the other encrypted areas of the document.

FIG. 5b is an illustration of the document having selected areas with each area having a unique and separate encryption from the other encrypted areas of the document. As shown, paragraph 28 did not change from the original paragraph. Paragraphs 32, 33 and 34 were each encrypted and the resulting information appears in a random unintelligible format as random letters in the document. In this example, the appropriate people would know the correct keys to apply to decrypt the information for which they have authority to read.

Figure 6:
FIG. 6 is an illustration of an encryption key used to initiate the decryption of encrypted material.
Figure 7:
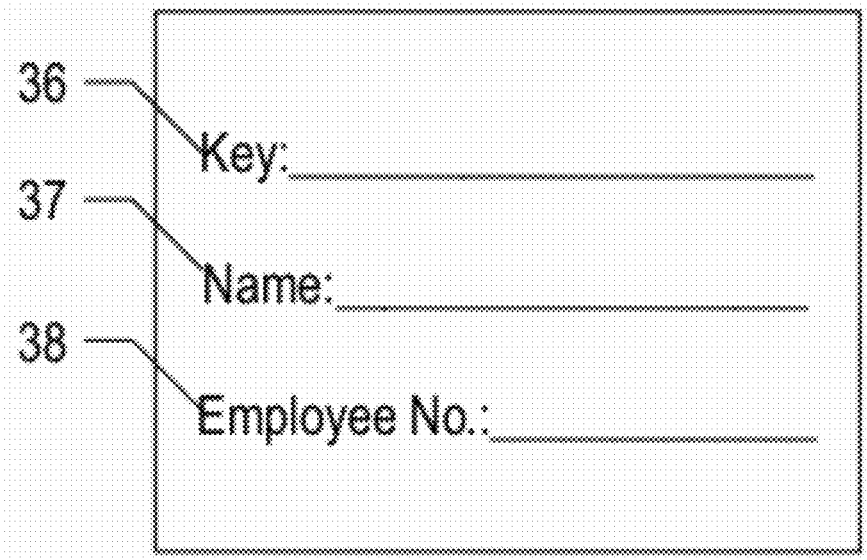
FIG. 7 is an illustration of information used to authenticate the request for access to encrypted information.

FIG. 6 shows an encryption key 35. This key contains 15 alphanumeric bytes. It should be noted that a 15-byte key is just one example of a key size that can be used in the implementation of the present invention. A user seeking access to some encrypted information would need to supply this key when trying to gain access to the information. As mentioned, this key could be for all encrypted segments of a document or for a specific segment of the document. FIG. 7 shows an embodiment, wherein the person seeking to gain access must supply along with the key 36, their name 37 and employee number 38. The authentication scheme may require only the encryption key and one of the other two pieces of information.

Figure 8:
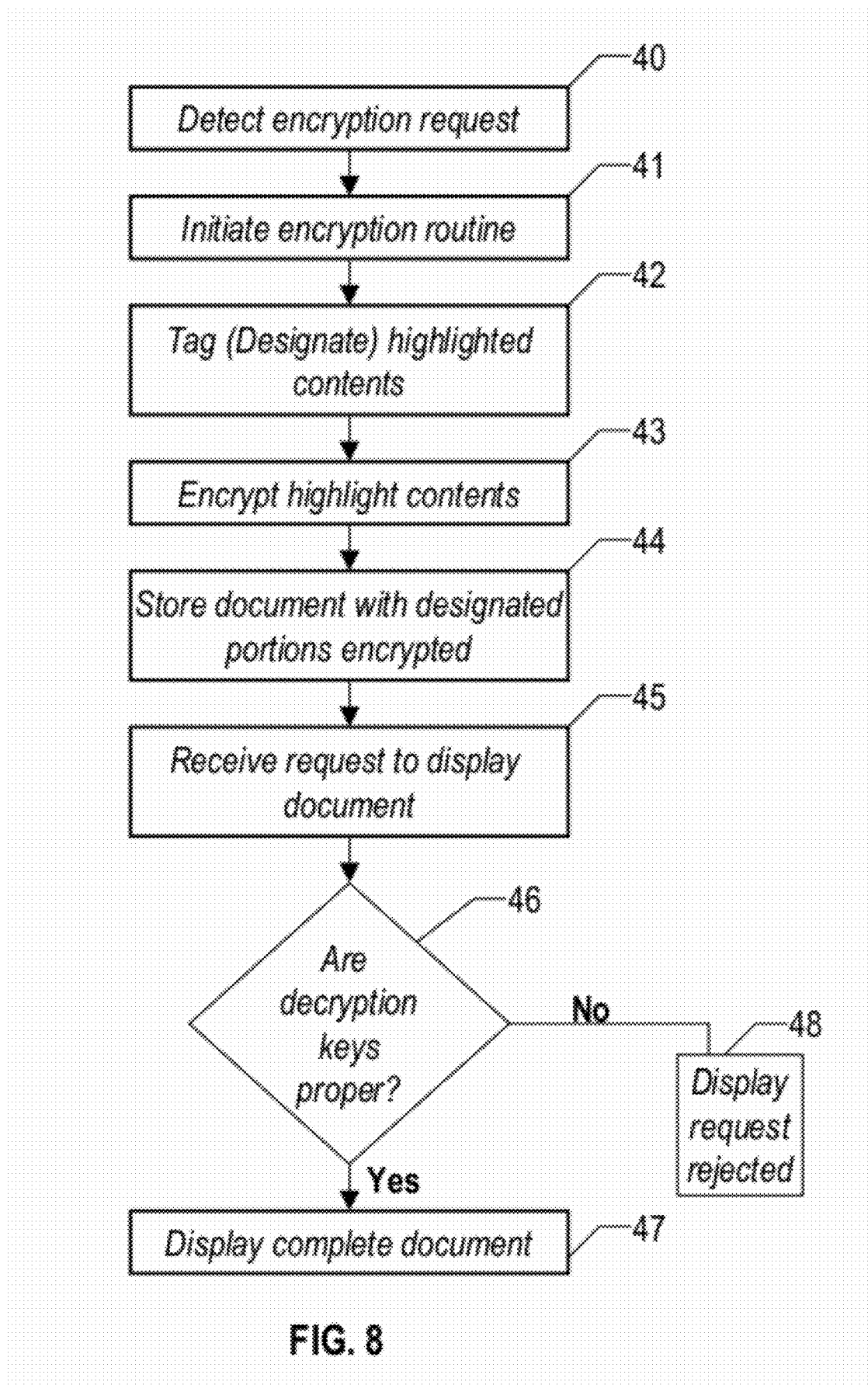
FIG. 8 is a flow diagram of the method of the present invention in which the encryption function is accomplished using encryption techniques at the location in the document of the selected information.

Referring to FIG. 8, step 40 of the method of the present invention detects a command to encrypt a portion of a document. At this point, the portion of the document to be encrypted is highlighted on the screen and viewed by the user. In step 41, the user can click an encryption icon 25. Clicking the encryption icon will initiate the encryption routine. Within this routine, step 42 will tag the highlighted portion and designate it for encryption. Step 43 will perform the encryption of the highlighted information using encryption techniques such as the previously described techniques. At the completion of the encryption process, the user can continue to edit the document and encrypt other portions of the document as the user desires. In step 44, the document will be stored in accordance with the commands of the user.

When there is an attempt to access an encrypted portion of the document, step 45 detects the attempt to access that encrypted portion. In step 46, there is a determination of whether the user attempting the access has proper authority to view that portion of the document. In this determination, the requestor must provide the correct key to initiate a decryption of the encrypted contents that the requestor wants to access. If the requestor has the correct key, the decryption of the encrypted contents occurs. If the decryption process is successful, the method moves to step 47, which displays the contents of the encrypted portion as part of the document. If in step 46, there is a determination that the user attempting the access does not have authority to view the document, the method moves to step 48 where the access attempt is rejected and only the unencrypted portions of the document are displayed to the requestor.

Figure 9:
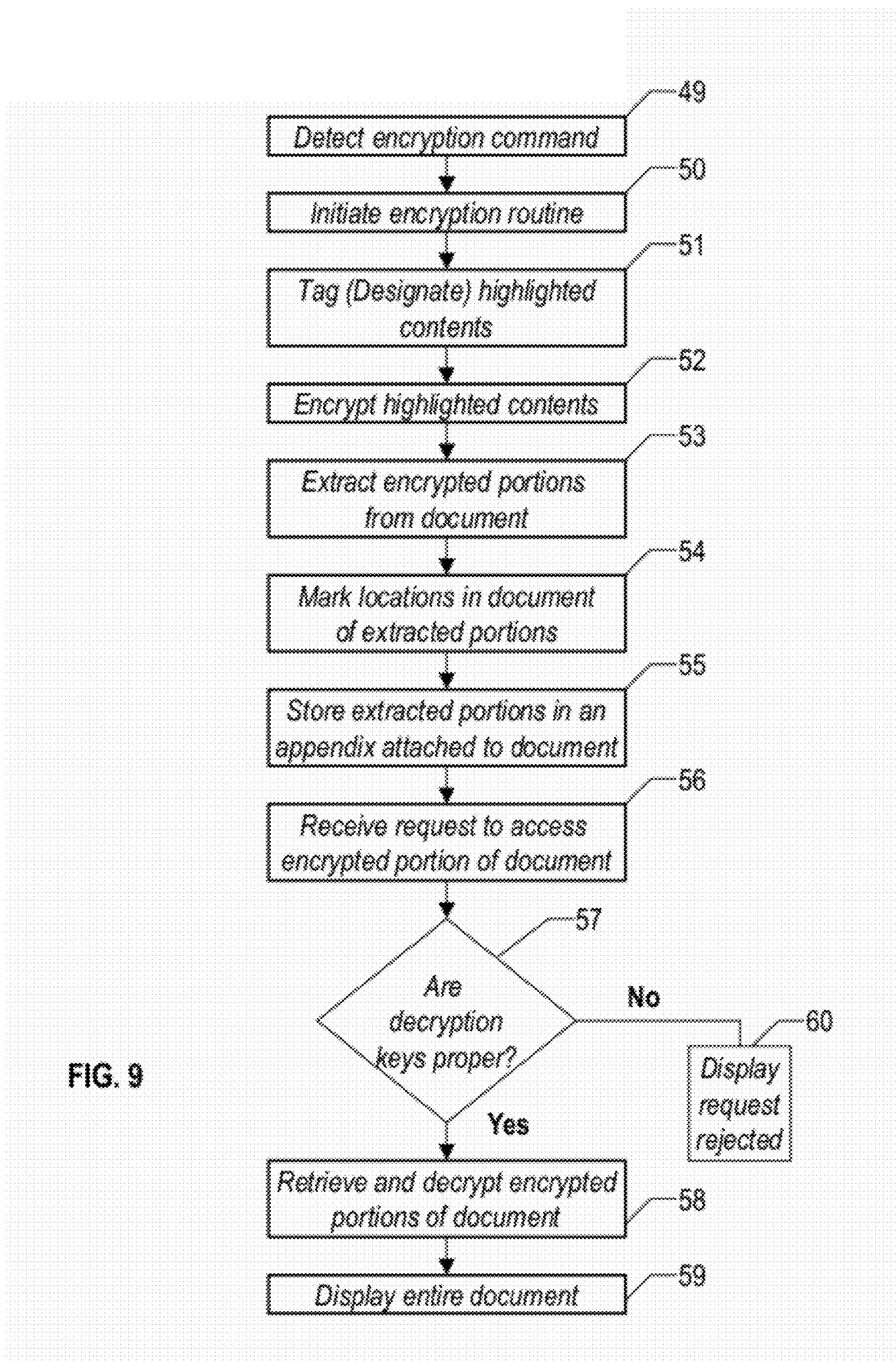
FIG. 9 is a flow diagram of the method of the present invention in which the encryption function is accomplished using encryption, extraction and document attachment techniques to conceal selected portions of a document.

Referring to FIG. 9, shown is an alternative embodiment of the present invention in which the encryption process also includes extraction of the encrypted information and storage of that information in an attachment to the document. In this method, steps 49, 50, 51 and 52 are the same as steps 40, 41, 42 and 43 respectively. In step 53, the highlighted contents are extracted from the document. Step 54 then marks the location in the document of the extracted materials. If the user desires to encrypt multiple portions of the document, each extracted portion will be tagged and the corresponding location of the document marked such that the locations of the particular can be identified during the document restoration process. Step 55 stores the extracted contents in an attachment location. This attachment can be located such that it is not viewable from the user screen.

As described in FIG. 8, when there is an attempt to open the document, step 56 detects a request to access an encrypted portion of the document. In step 57, there is a determination of whether the requestor has proper authority to view the document. In the method of FIG. 9, the user desiring access must supply the proper decryption key in order to decrypt the encrypted information. If the provided key is proper, the method moves to step 58, which decrypts, retrieves the encrypted portions of the document from the attachment location and inserts these portions in the document in the appropriate locations. Step 59 then displays the requested portion as part of the document. If in step 57, the supplied keys are not proper, the method moves to step 60 where there is a rejection of the access request.

Figure 10:
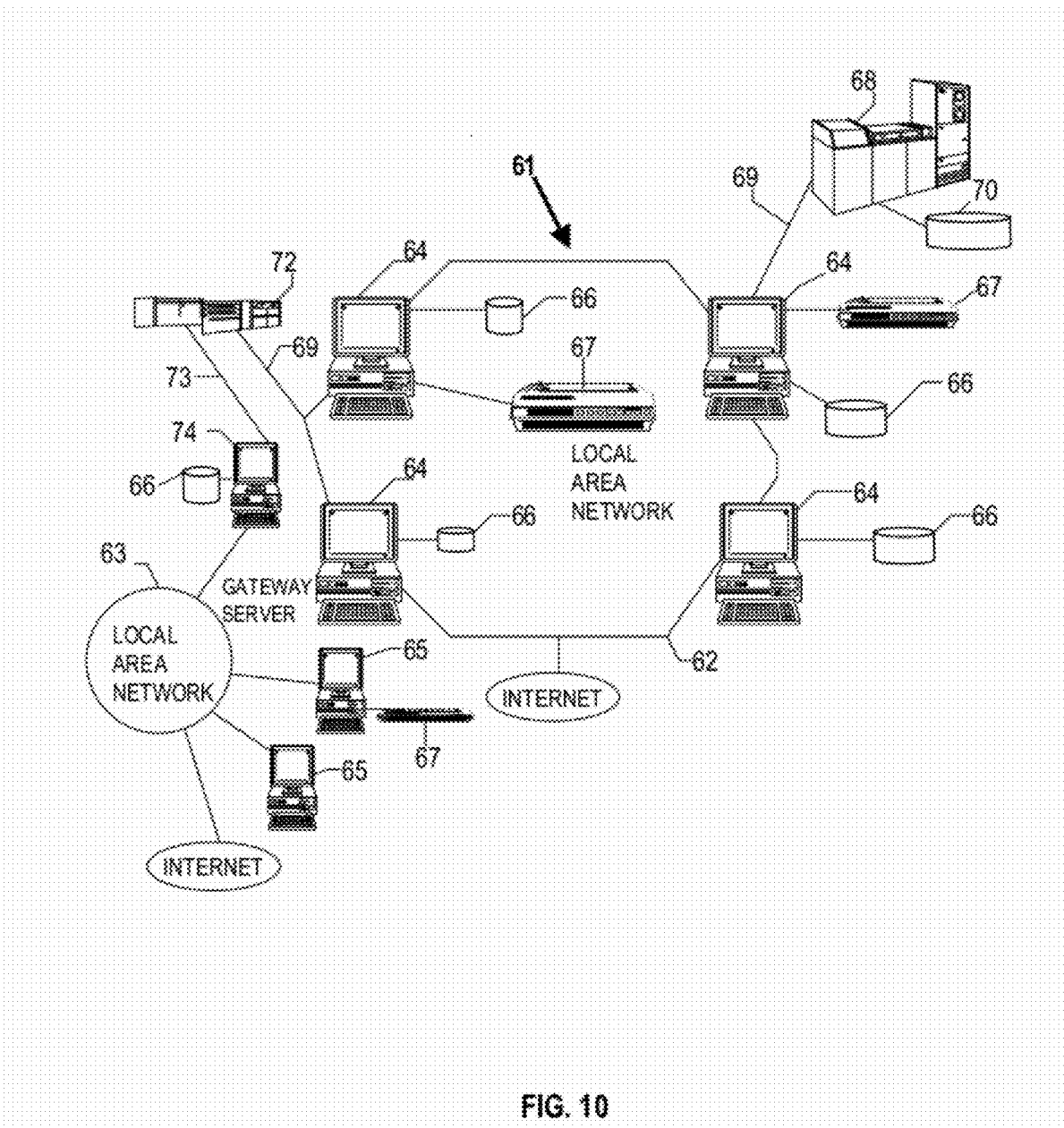
FIG. 10 is a diagram of a computing network over which electronic messages may be transmitted between a sender location and a receiver location in the present invention.

As previously mentioned, the documents with encrypted contents may be transmitted across computing networks such as the one illustrated in FIG. 10. The method of the present invention may be implemented in a global computer network environment such as the Internet. With reference now FIG. 10, there is depicted a pictorial representation of a distributed computer network environment 61 in which one may implement the method and system of the present invention. As may be seen, distributed data processing system 61 may include a plurality of networks, such as Local Area Networks (LAN) 62 and 63, each of which preferably includes a plurality of individual computers 64 and 65, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 66 and/or a printer/output device 67. One or more such storage devices 66 may be utilized, in accordance with the method of the present invention, to store the various data objects or documents which may be periodically accessed and processed by a user within distributed data processing system 61, in accordance with the method and system of the present invention. In a manner well known in the prior art, each such data processing procedure or document may be stored within a storage device 66 which is associated with a Resource Manager or Library Service, which is responsible for maintaining and updating all resource objects associated therewith.

Still referring to FIG. 10, it may be seen that distributed data processing system 61 may also include multiple mainframe computers, such as mainframe computer 68, which may be preferably coupled to Local Area Network (LAN) 62 by means of communications link 69. Mainframe computer 68 may also be coupled to a storage device 70 which may serve as remote storage for Local Area Network (LAN) 62. A second Local Area Network (LAN) 63 may be coupled to Local Area Network (LAN) 62 via communications controller 72 and communications link 73 to a gateway server 74. Gateway server 74 is preferably an individual computer or Intelligent Work Station (IWS), which serves to link Local Area Network (LAN) 63 to Local Area Network (LAN) 62. As discussed above with respect to Local Area Network (LAN) 62 and Local Area Network (LAN) 62, a plurality of data processing procedures or documents may be stored within storage device 70 and controlled by mainframe computer 68, as Resource Manager or Library Service for the data processing procedures and documents thus stored. Of course, those skilled in the art will appreciate that mainframe computer 68 may be located a great geographical distance from Local Area Network (LAN) 62 and similarly Local Area Network (LAN) 62 may be located a substantial distance from Local Area Network (LAN) 65. That is, Local Area Network (LAN) 65 may be located in California while Local Area Network (LAN) 62 may be located within Texas and mainframe computer 68 may be located in New York.

Figures 11A, 11B:
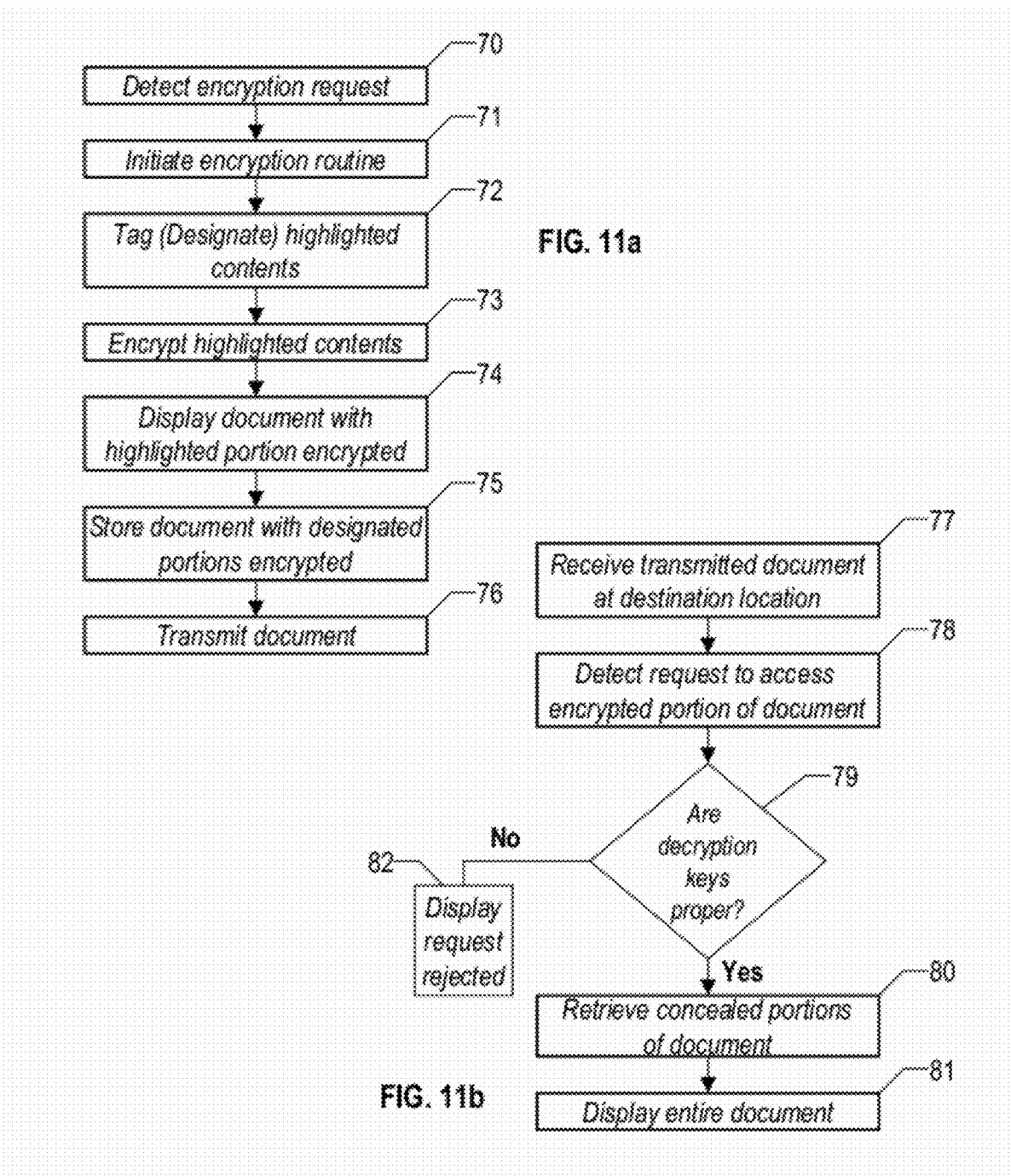
FIG. 11a is a flow diagram of the method of the present invention in which encryption techniques are used to conceal selected portions of a document for transmission across a computing network.
FIG. 11b is a flow diagram of the method of the present invention in which decryption techniques are used to restore encrypted portions of a document following transmission of the document across a computing network.

FIGS. 11a and 11b illustrate an implementation of the present invention for transmission across a computing network using encryption techniques to conceal contents of the document. In FIG. 11a, shown is a flow diagram of the method of the present invention in which encryption techniques are used to encrypted portions of a document for transmission across a computing network. In this method, steps 70, 71, 72, 73, 74 and 75 are the same as steps 40, 41, 42, 43, 44 and 45 in FIG. 8 respectively. In step 76, there is a transmission over a computing network of the document containing portions that are encrypted using encryption techniques.

In FIG. 11b, a transmitted message is received at a destination location in step 77. When there is an attempt to open the document, step 78 detects a request to access an encrypted portion of the document. In step 79, there is a determination of whether the requestor has the proper decryption keys for that encrypted portion of the document. As in the method of FIG. 8, step 80 will perform a decryption of the encrypted contents. If the decryption process is successful, the method moves to step 81, which displays the contents of the previously encrypted portion of the document. If in step 79, there is a determination that the requestor does not have the proper decryption keys, the method moves to step 82 where the access requested is rejected.

FIGS. 12a and 12b illustrate the transmission of documents across a computing network. In this embodiment, the encryption process also includes extraction of the encrypted information and storage of that information in an attachment to the document as described in FIG. 9. In this method, steps 83, 84, 85, 86, 87, 88 and 89 are the same as steps 49, 50, 51, 52, 53, 54 and 55 in FIG. 9 respectively. In step 90, there is a transmission over a computer network of the document with an attachment containing encrypted portions of the document. The transmission of the attachment is in a manner similar to the transmission of other electronic message attachments. However, this attachment is not indicated and is not viewable as is a conventional electronic mail attachment.

When there is an attempt to access an encrypted portion of the document, step 91 detects a request to access the encrypted portion. In step 92, there is a determination of whether the requestor has proper authority to view the document. As in the method of FIG. 9, in this method, the user desiring access must supply the proper decryption key in order to decrypt the encrypted information. If the requestor provides the proper decryption key, the method moves to step 93, which decrypts and retrieves the encrypted portion from the attachment location and inserts this portion into the document in the appropriate locations. Step 94 then displays the decrypted portion of the document. This display could be as part of the entire document or a separate display. If the authentication is not successful, in step 95, the access request fails.

As the document is displayed, as any encrypted section is encountered, the displaying software would try to decrypt the encrypted section with each of the previously entered encryption keys until one successfully decrypts the section. If none of them succeeds in decrypting the section, the user would be prompted to add yet another decryption key to his list (that would presumably work for this section.) The way the system could tell whether a decryption was successful or not would be to include a known string to every section to be encrypted. Then, on decryption, if the added string does not turn into the known string, then the decryption would be considered a failure, which would then cause the system to try a different key from the list entered by the user. The encryption keys should be of sufficient length and methods used for encryption be sufficiently strong to avoid any possibility of using these multiply encrypted copies to discover the encoded text or any of the keys by an outside party. Also, if one party knows the text because he has one of the keys, the techniques should not make it possible to permit that user to discover any of the other keys. One way to help prevent this is to have a different random string appended to each text copy before it is encrypted. This random string is discarded after decryption.

Furthermore, if a section of the document is supposed to be decryptable with more than one key, then multiple copies of that section would be included in the document file, each copy encrypted with a different key. There would of course be some tag information that indicated that the particular section is duplicated and encrypted with different keys. This would be used to have some parts of the document encrypted for department A viewing, for example, and other non-disjoint parts for viewing by department B.

It is important to note that while the present invention has been described in the context of a fully functioning data processing system, those skilled in the art will appreciate that the processes of the present invention are capable of being distributed in the form of instructions stored in a computer readable medium of a storage device in the data processing system 10 of FIG. 1. The storage device may include EPROM, ROM, tape, paper, floppy disc, hard disk drive, and CD-ROMs. The data processing system 10 of FIG. 1 comprises the storage device, the processor 11, and a memory device (e.g., RAM). The instructions on the storage device are configured to be executed by the processor 11 via the memory device to implement the methods of the present invention.

We claim:

1. A system comprising a processor, a memory device, and a computer readable storage device, said storage device containing instructions configured to be executed by the processor via the memory device to implement a method for selective encryption within a document, said method comprising:

detecting a portion of the document selected and marked for encryption, said selected portion of the document consisting of plaintext;

encrypting the detected portion of the document selected for encryption as ciphertext;

displaying the document with the selected portion of the document encrypted;

detecting an attempt by an accessor to access the encrypted portion of the document;

decrypting the encrypted portion of the document with a proper decryption key, wherein said decrypting comprises decrypting the encrypted portion of the document in response to presentation of required data by the accessor, and wherein the required data comprises the proper decryption key, a name of the accessor, and an employee number of the accessor; and displaying the portion of the document as decrypted.

2. The system of claim 1, said method further comprising after said displaying step, the steps of:

detecting an attempt to access another encrypted portion of the document via a decryption attempt; and determining whether the proper decryption keys for said decryption attempt have been presented.

3. The system of claim 2, said method further comprising:

in response to determining that the proper decryption keys for said decryption attempt have not been presented, rejecting the access attempt by substituting a graphic in the another encrypted portion of the document to indicate that said decryption attempt has failed.

4. The system of claim 1, said method further comprising after said displaying the document, transmitting the document across a computing network to an identified destination.

5. The system of claim 1, wherein said displaying the document comprises displaying the document with the selected portion of the document being displayed as said plaintext of the selected portion with diagonal red lines drawn under the plaintext.

6. The system of claim 1, said method further comprising:

displaying the document with the selected portion being displayed as said ciphertext or as said plaintext with diagonal red lines drawn under the plaintext, in response to determining that the accessor is not authorized to access the encrypted portion of the document.

7. The system of claim 1, wherein said encrypting is performed in response to selection of an Encrypt icon from a pop-up menu that consists of said Encrypt icon, a File icon, an Edit icon, a View icon, a Tools icon, and a Help icon.

8. The system of claim 1, said method further comprising:

determining that the accessor is authorized to access the encrypted portion of the document.

9. The system of claim 1, said method further comprising:

displaying the document with any previously encrypted portions of the document decrypted in response to determining that the accessor is authorized to access the encrypted portion of the document.

10. The system of claim 1, said method further comprising:

extracting the encrypted portion of the document and storing the extracted portion of the document in an appendix location in the document.

11. The system of claim 10, said method further comprising:

filling the appendix location of the stored extracted portion of the document with random letters.

* * * * *